No. 747,490. PATENTED DEC. 22, 1903.
DE LEONARD RUGG.
ICE CREAM FREEZER.
APPLICATION FILED APR. 28, 1903.
NO MODEL.
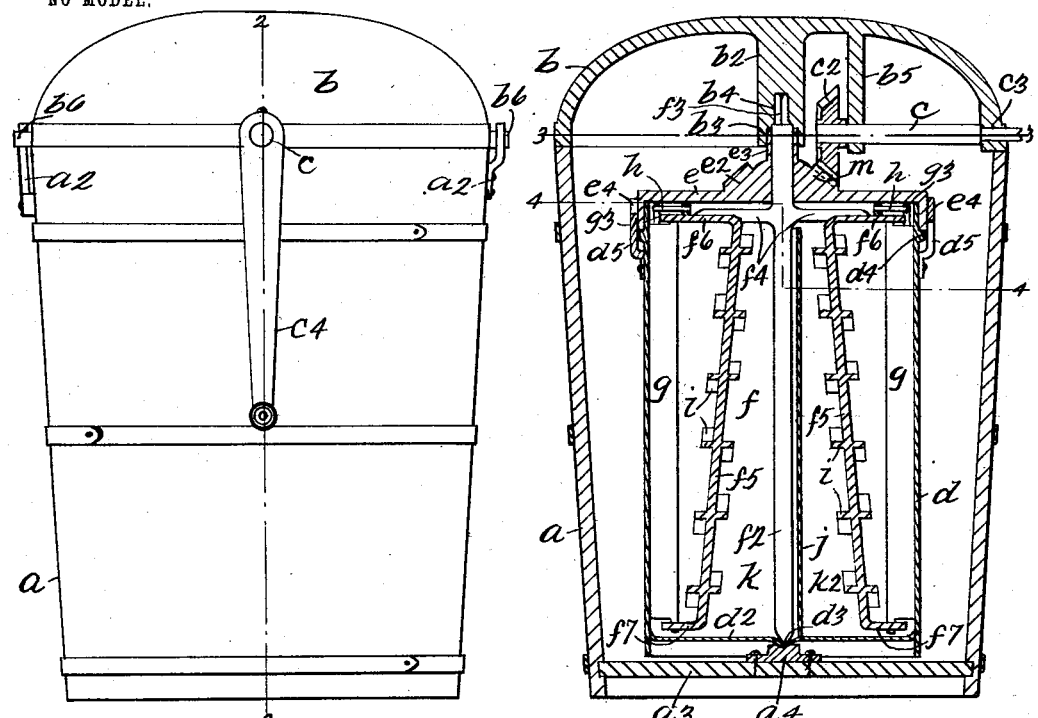
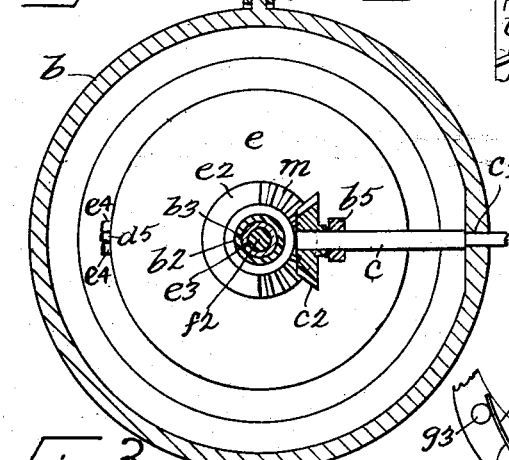
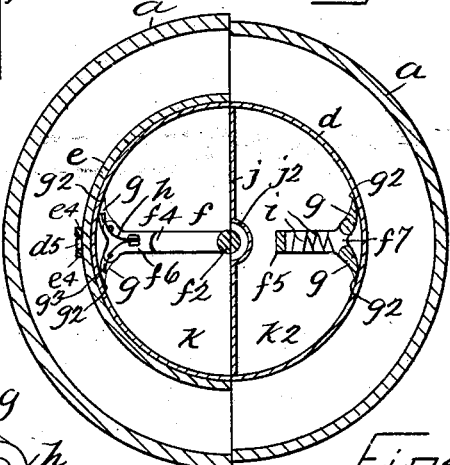
WITNESSES
J. C. Larsen
F. A. Stewart
INVENTOR
De Leonard Rugg
BY
Edgar Late & Co.
ATTORNEYS No. 747,490. Patented December 22, 1903.

UNITED STATES PATENT OFFICE.

DE LEONARD RUGG, OF CATSKILL, NEW YORK.

ICE-CREAM FREEZER.

SPECIFICATION forming part of Letters Patent No. 747,490, dated December 22, 1903.

Application filed April 28, 1903. Serial No. 154,632. (No model.)

*To all whom it may concern:*

Be it known that I, DE LEONARD RUGG, a citizen of the United States, residing at Catskill, in the county of Greene and State of New York, have invented certain new and useful Improvements in Ice-Cream Freezers, of which the following is a specification, such as will enable those skilled in the art to which it appertains to make and use the same.

The object of this invention is to provide an improved device designed for use as a freezer of creams and similar substances, a further object being to provide a device of the class specified which is so constructed that creams of different varieties or different substances may be frozen at the same time in the same freezer or can; and with these and other objects in view the invention consists in a device or apparatus of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of a freezer for creams or other substances made according to my invention; Fig. 2, a vertical section on the line 2 2 of Fig. 1; Fig. 3, a transverse section on the line 3 3 of Fig. 2; Fig. 4, a section on the line 4 4 of Fig. 2; Fig. 5, a side view of a detail of a dasher or stirrer which I employ, and Fig. 6 a plan view of another detail thereof.

In the practice of my invention I provide a main outer casing or receptacle $a$, which is of the usual form and provided with a removable cover $b$, which is preferably convexoconcave in cross-section, as shown, and which in the form of construction shown is provided with a central depending member $b^2$, having in the bottom thereof a circular recess $b^3$, above which and communicating therewith is a recess $b^4$, which is angular in cross-section, and the cover $b$ in the form of construction shown is also provided with another depending member $b^5$, which serves as a support for a crank-shaft $c$, which is provided at its inner end with a beveled gear-wheel $c^2$ and which passes outwardly through the perimeter of the cover $b$, as shown at $c^3$, and which is adapted to be operated by a crank $c^4$. The cover $b$ is also provided at its opposite sides with lugs or projections $b^6$, which operate, in connection with keepers or holders $a^2$, to prevent the turning of the cover on the casing or receptacle $a$.

Centrally of the bottom $a^3$ of the casing or receptacle $a$ is secured a pivot-block $a^4$, and placed centrally within the casing or receptacle $a$ is a can $d$, the bottom $d^2$ of which is provided centrally with a pivot member $d^3$, which rests on the pivot-block $a^4$, and this pivot member may be formed integrally with the bottom $a^2$ of the can $d$ or may be formed separately or in any desired manner.

The can $d$ is provided with a removable top $e$, having a central conical member $e^2$, provided with an upwardly-directed tubular member $e^3$, which enters and is adapted to turn in the tubular recess $b^3$ of the depending member $b^2$ of the cover $b$, and said can $d$ is also preferably provided near the top thereof with an annular bead $d^4$ and with upwardly-directed lugs or projections $d^5$, formed integrally therewith or secured thereto, and the cover $e$ is also provided at each side with shoulders, lugs, or projections $e^4$, which operate in connection therewith to prevent the cover $e$ from turning on the can $d$. The means, however, herein shown and described for connecting the cover $e$ with the can $d$, so as to prevent it from turning on said can, and the cover $b$ with the casing or receptacle $a$, so as to prevent it from turning on said casing or receptacle, may be varied or modified within any desired limits, the only object in this connection being to provide any suitable devices which will accomplish the desired result.

Within the can $a$ is placed a dasher or stirrer $f$, which in the form of construction shown comprises a central shaft $f^2$, the lower end of which is pivoted in the pivot member $d^3$ of the bottom $d^2$ of the can $d$ and the upper end of which passes vertically through the top conical member $e^2$ of the cover $e$ of the can $d$ and through the tubular member $e^3$, and the upper end of said shaft is provided with an angular member $f^3$, which fits in the angular recess $b^4$ in the depending member $b^2$ of the cover $b$.

The shaft $f$, near the top thereof and within the can $d$, is provided in the form of construction shown with two radial arms $f^4$, with which are connected depending members $f^5$, and these depending members $f^5$ are provided at their upper ends with outwardly-directed arms $f^6$ and at their lower ends with similar outwardly-directed arms $f^7$, and the arms $f^4$ of the shaft $f$ and the arms $f^6$ may be formed integrally, if desired, and the depending members $f^5$ may be connected with the arms $f^4$ in any desired manner.

In the form of construction shown I pivot between the arms $f^6$ and $f^7$ at each side two vertically-arranged paddles $g$, and these paddles are shaped in cross-section, as shown in Figs. 4 and 6, and are provided with edges $g^2$, adapted to bear on the inner surface of the can $d$, and secured to the arms $f^6$ at the top of the dasher or stirrer are springs $h$, which bear on upwardly-directed lugs or projections $g^3$, formed on or connected with the paddles $g$ and which serve to hold the edges of said paddles against the inner surface of the can $d$, and the depending members $f^5$ of the dasher or stirrer are also preferably provided at their opposite sides with radial and alternately-arranged paddles $i$.

The springs $h$ may be connected with the arms $f^6$ in any desired way, and in Figs. 4 and 6 I have shown two different ways of accomplishing this result, and any suitable means may be provided for forcing the paddles $g$ into connection with the inner surface of the can $b$, and it is not absolutely necessary that this form of spring-operated paddles be employed, as the dasher or stirrer and all its parts may be constructed in various ways without departing from the spirit of my invention, as will hereinafter appear. The can $d$ is also provided with a central vertical partition $j$, in one side of which is a central vertical recess $j^2$, through which the shaft $f^2$ of the dasher or stirrer passes, and the partition $j$ thus serves to divide the can $d$ into two separate compartments $k$ and $k^2$, in which different varieties of cream or different substances which it is desired to freeze may be placed.

The conical member $e^2$ of the cover $e$ of the can $d$ is provided with a beveled gear $m$, in connection with which the beveled gear-wheel $c^2$ on the crank-shaft $c$ operates, and by oscillating or swinging the crank $c^4$ in a vertical plane the crank-shaft $c$ will be similarly operated or rotated through a part of a revolution, and this will result in oscillating or rotating the can $d$ through a partial revolution in opposite directions. It will be observed that the dasher or stirrer in this operation remains stationary while the can $d$ is rotated or oscillated, and the limit of the movement of the said can in opposite direction is in the form of construction shown accomplished by the striking of the partition $j$ against the arms $f^4$ of the separate side members of the dasher or stirrer. Any suitable means, however, may be provided for limiting the oscillating or rotating movement of the can $d$, and various changes in and modifications of the form and construction of the dasher or stirrer and the separate parts thereof may be made without departing from the spirit of my invention or sacrificing its advantages. By means of this construction it will be seen that I provide a freezer of the class specified having separate compartments in which different articles which it is desired to freeze may be placed, and it will also be seen that the essential features of this apparatus consist of two main parts constituting the freezer proper, one of which consists of a can divided into separate vertical compartments and the other a dasher or stirrer located therein, one of said parts being adapted to be rotated or oscillated in opposite directions and through a part of a revolution.

Having fully described my invention, what I claim as new, and desire to secure by Letters Patent, is—

1. A device for freezing creams and other substances, comprising a main outer casing or receptacle, a freezer proper placed therein and consisting of two parts one of which comprises a can divided into separate vertical compartments and the other a dasher or stirrer part of which is in each of said compartments, and means for rotating or oscillating one of the parts of the freezer proper through a part of a revolution, substantially as shown and described.

2. A device for freezing creams and other substances, comprising a main outer casing, a rotatable can placed therein and divided into separate vertical compartments, a stationary dasher or stirrer placed vertically in said can and composed of separate members located in each of said compartments, and means for rotating the can in opposite directions and through a part of a revolution only, substantially as shown and described.

3. A device for freezing creams and other substances, comprising a main outer casing, a rotatable can placed therein and divided into separate vertical compartments, a stationary dasher or stirrer placed vertically in said can and composed of separate members located in each of said compartments, and means for rotating the can in opposite directions and through a part of a revolution only, said main outer casing and said can being each provided with a removable cover, substantially as shown and described.

4. A device for freezing creams and other substances, comprising a main outer casing having a removable cover, a rotatable can placed therein and provided with a removable cover, said can being also provided with a central vertical partition forming separate vertical compartments, a stationary dasher or stirrer placed in said can and having members occupying both of said compartments, and means for rotating or oscillating said can in opposite directions, substantially as shown and described.

5. A device for freezing creams and other substances, comprising a main outer casing having a removable cover, a rotatable can placed therein and provided with a removable cover and with a central vertical partition whereby said can is divided into separate vertical compartments, a dasher or stirrer pivoted in said can and provided with separate members occupying each of said compartments, said members being provided with vertically-arranged, pivoted and spring-operated blades the edges of which bear on the inner surface of said can, substantially as shown and described.

6. In a device for freezing creams and other substances, a rotatable can divided into separate vertical compartments, a dasher or stirrer mounted in said can and provided with separate members occupying each of said compartments and means for rotating the can in opposite directions through a part of a revolution, substantially as shown and described.

7. In a device for freezing creams and other substances, a rotatable can divided into separate vertical compartments, a dasher or stirrer mounted in said can and provided with separate members occupying each of said compartments and means for rotating the can in opposite directions through a part of a revolution, the separate parts of the dasher or stirrer being provided with vertically-arranged pivoted blades which are spring-operated and adapted to bear on the inner surface of said can, substantially as shown and described.

In testimony that I claim the foregoing as my invention I have signed my name, in presence of the subscribing witnesses, this 27th day of April, 1903.

DE LEONARD RUGG.

Witnesses:
    J. C. LARSEN,
    F. A. STEWART.